United States Patent [19]

Brantley, Jr.

[11] 3,951,129

[45] Apr. 20, 1976

[54] SOLAR ENERGY ABSORBER

[75] Inventor: Lott W. Brantley, Jr., Union Grove, Ala.

[73] Assignee: The United States of America as represented by the United States National Aeronautics and Space Administration, Washington, D.C.

[22] Filed: Oct. 29, 1974

[21] Appl. No.: 518,684

[52] U.S. Cl. ............................................. 126/271
[51] Int. Cl.² ......................................... F24J 3/02
[58] Field of Search ........... 126/270, 271; 237/1 A; 350/179, 312

[56] References Cited
UNITED STATES PATENTS

| | | | |
|---|---|---|---|
| 1,093,925 | 4/1914 | Foresman | 126/271 |
| 1,599,481 | 9/1926 | Marcuse | 126/271 |
| 1,704,173 | 3/1929 | Chesney | 126/271 |
| 2,783,682 | 3/1957 | Swenson | 126/271 |
| 3,815,574 | 6/1974 | Gaydos, Jr. | 126/271 |

Primary Examiner—Kenneth W. Sprague
Assistant Examiner—James C. Yeung
Attorney, Agent, or Firm—Wayland H. Riggins; L. D. Wofford, Jr.; John R. Manning

[57] ABSTRACT

A solar energy absorber including a tubular absorber surface through which a fluid passes for transferring thermal energy from the absorber to other devices. Positioned above the tubular absorber surface are a plurality of spaced glass layers. Positioned between an upper layer and the next layer is vacuum or air for minimizing thermal energy losses through convection. A clear liquid passes between two intermediate layers of glass for transferring by means of conduction the thermal energy absorbed therein by either the initial passage of the visible spectrum of electromagnetic rays or by infrared radiation radiated from an absorber positioned therebelow.

3 Claims, 2 Drawing Figures

SOLAR ENERGY ABSORBER

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates to a solar energy absorber and more particularly to using multiple glass layers for reducing the heat loss through re-radiation from the heat absorbing surfaces by circulating a heat conducting fluid between intermediate layers of glass to carry away the re-radiation heat.

Heretofore, most systems designed to trap solar energy utilized a system often called "the green house effect". In such systems, visible radiation passes through one or more transparent outer covers and is almost entirely absorbed by an absorptive surface. The absorptive surface was usually constructed of tubing wherein a fluid must pass therethrough for transferring thermal energy absorbed by conduction. The outer cover, while transparent to visible radiation is largely opaque to infrared radiation off of the absorber surface, and hence, absorbs it. It conducts the energy that is not re-radiated to the absorber surface through the outer cover where it is convected or re-radiated away. Examples of such a system are shown in U.S. Pat. No. 3,077,190 and U.S. Pat. No. 2,969,788.

For a given absorptive surface, the amount of thermal energy lost by convection or re-radiation is a function of the outer cover temperature. Often more than one outer cover is used to reduce the infrared energy reaching and, consequently, heating the final cover.

SUMMARY OF THE INVENTION

It has been found, in accordance with the present invention, that an effective solar energy absorber can be constructed which reduces the heat loss through re-radiation from the absorber surface. The apparatus includes a tubular absorber with a triangular surface which has a surface coating thereon having a high radiation absorption factor ($\alpha$) for absorbing the visible spectrum of the electromagnetic energy emitted by the sun and a low thermal emittance factor ($\epsilon$). Positioned between the outside atmosphere and the tubular absorber is a plurality of spaced glass plates for transmitting the visible spectrum to the absorber and for trapping between the spaces of the glass plates heat or thermal energy from the infrared radiation which is re-radiated from the tubular absorber. Between the first and second plates of glass a fluid is circulated for removing the heat from the glass plates so as to reduce the heat loss from the absorber. Either a separate fluid or the same fluid is conveyed in heat exchange relationship with the tubular absorber for absorbing thermal energy therefrom.

Accordingly, it is an important object of the present invention to provide a solar energy absorber which minimizes thermal energy loss through re-radiation by using an energy removal system.

Still another important object of the present invention is to provide a solar energy absorber which utilizes a pair of transparent plates between which a liquid is passed for removing thermal energy for subsequent use so as to minimize thermal energy losses in the system.

Still another important object of the present invention is to provide a solar energy absorber which includes a plurality of spaced transparent plates with an energy removal medium to reduce the temperature difference between the outer glass plate and the adjacent glass plate so as to minimize thermal losses.

Another important object of the present invention is to provide a simple and efficient solar energy absorbing device.

These and other objects of the invention will become more apparent from reading the following specification and attendant claims.

DESCRIPTION OF THE PREFERRED EMBODIMENT

Figure 1:
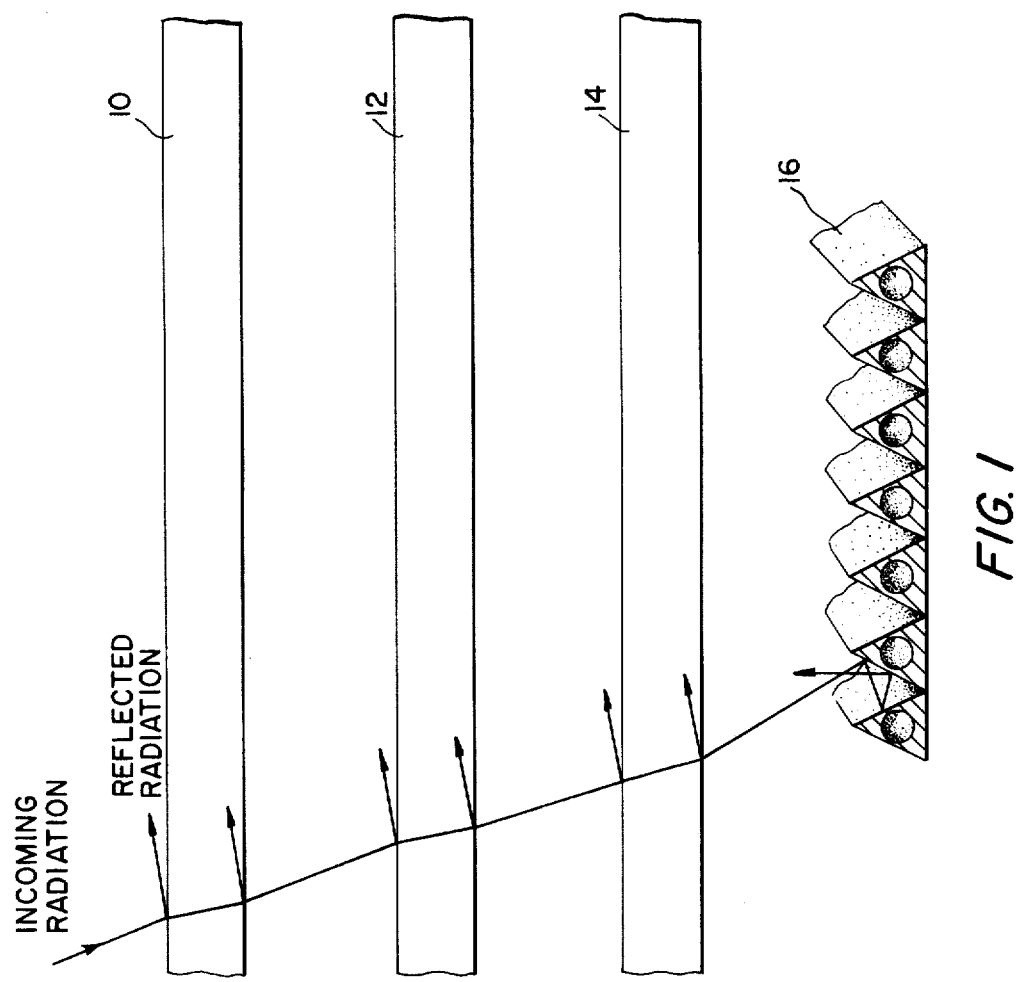
FIG. 1 of the drawings is a schematic diagram illustrating a conventional solar energy absorber.

Referring in more detail to FIG. 1 of the drawings, there is illustrated a portion of a conventional solar energy absorber. The solar energy absorber includes three glass plates 10, 12 and 14 stacked one above the other with a vacuum or air layer carried therebetween. Directly below the lower glass plate 14 and spaced therefrom is an absorber member 16. The absorber member 16 may be constructed of triangular shaped tubing coated to absorb the visible spectrum of electromagnetic radiation. Fluid passes through the tubular member 16 for transferring the thermal energy absorbed thereby. One problem with the solar energy absorber shown in FIG. 1 is that since the visible spectrum of the electromagnetic waves have to pass through the three layers of glass, 10, 12 and 14, a certain amount thereof is reflected affecting the efficiency of the overall system. Another problem with the system is that as the energy passes through the glass layers 10, 12 and 14, a certain amount of the energy is absorbed also affecting the efficiency of the system. When dust collects on the glass layers 10, 12 and 14 this problem is enhanced.

Theoretically, in the device shown in FIG. 1, additional glass layers could be stacked one above the other so as to minimize the amount of infrared radiation loss. However, as additional layers are added, such cuts down on the amount of the visible spectrum of electromagnetic radiation passing therethrough to reach the ultimate solar energy absorber.

Figure 2:
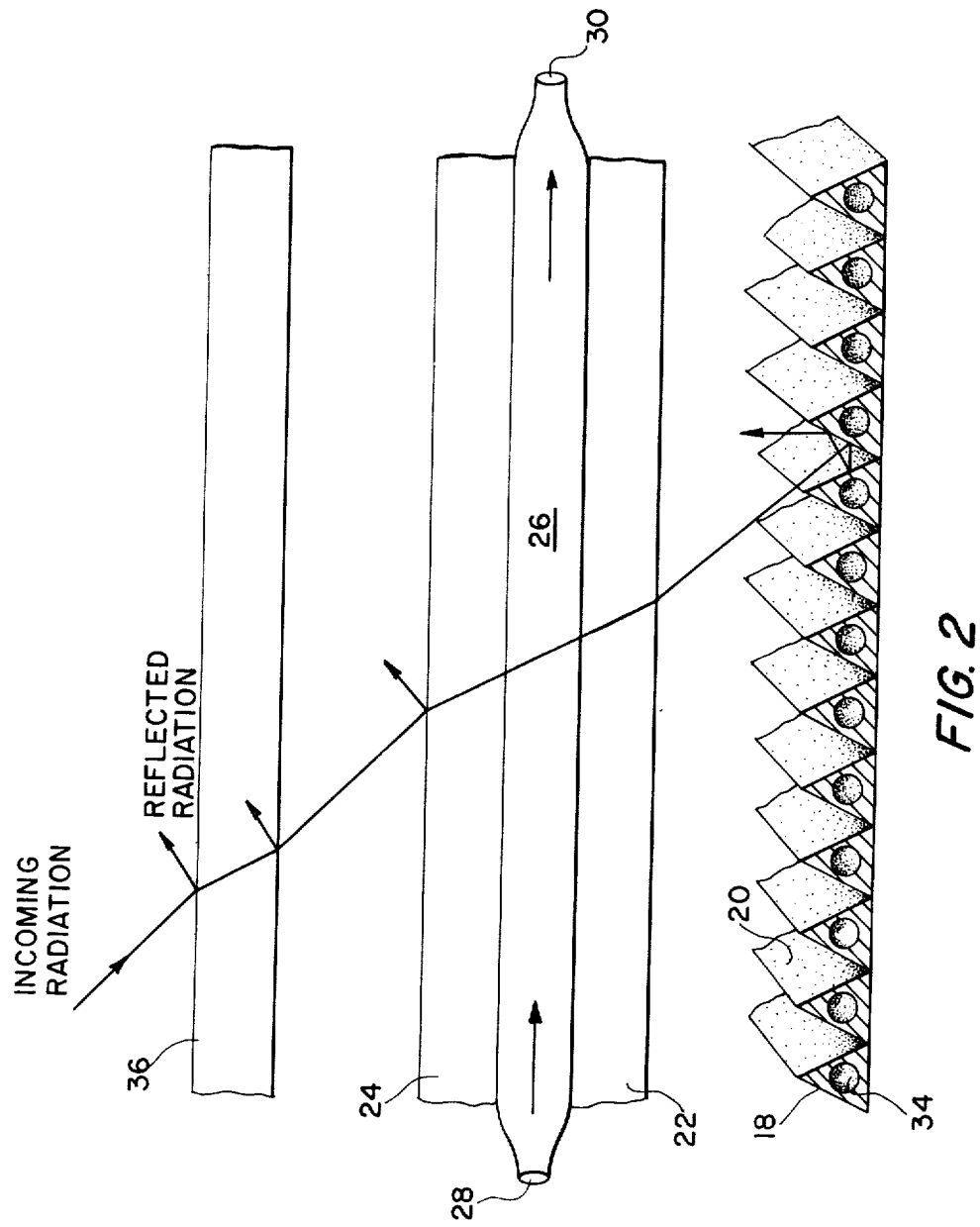
FIG. 2 is a schematic diagram illustrating a solar energy absorber in accordance with this invention.

Referring in more detail to FIG. 2 of the drawings, there is illustrated, in accordance with this invention, an absorber surface constructed of a triangular shaped tubular member 18. The tubular absorber 18 of FIG. 2 is shown schematically and the adjacent layers thereof communicate with each other and the overall configuration whether circular, rectangular, etc. depends on the desired application of the device. A coating 20 is provided on the tubular absorbent surface 18 for absorbing the visible spectrum of electromagnetic waves generated by the sun. The coating is characterized by having a high $\alpha$ value (absorption factor) for the visible spectrum of electromagnetic radiation and a low $\epsilon$ value (emittance factor) making it a poor thermal emitter. One suitable coating is described in the U.S. Pat. Application of James R. Lowery, Ser. No. 458,484 assigned to NASA, and entitled "A PANEL FOR SELECTIVELY ABSORBING SOLAR THERMAL ENERGY AND THE METHOD FOR MANUFACTURING THE PANEL".

Positioned directly above the tubular absorber 18 is a glass plate 22. Interposed between the glass plate 22 and absorber 18 is a vacuum or air. Directly above the glass plate 22 is another glass plate 24. The ends of the glass plates 22 and 24 are sealed to provide a sealed conduit 26 therebetween. A clear liquid such as pure water is fed into an inlet port 28 carried adjacent one end of the conduit 26 and exits out of an outlet port 30 carried adjacent the other end of the conduit 26 for removing thermal energy contained in the plates 22 and 24. While water may be utilized as the fluid for removing the thermal energy from the plates 22 and 24 in some applications it may be desirable to utilize a clear liquid having a higher or lower boiling point.

A gas (air, helium, hydrogen, etc.) could also be utilized for removing the heat from the plates 22 and 24.

A source of fluid may be provided which employs two separate fluid reservoirs so that the sealed conduit 26 may be supplied with a fluid or a gas separate from the fluid conveyed to a bore 34 located in tubular absorber 18. In this case, any conventional pumping means may be used to convey the two separate fluids to the inlet 28 and to the bore 34 respectively. In the case where the same fluid is used in both 26 and 34 a source of fluid with a single reservoir may be provided using conventional pumping means to convey the fluid separately to inlet 28 and the bore 34. It may also be desirable to convey the fluid passing from the outlet 30 directly through the bore 34 of tubular absorber 18 instead of conveying the fluid separately to each one.

Superimposed above the glass plate 24 is an exterior glass plate 36. The ends of all of the glass plates 22, 24 and 36 are generally sealed with a vacuum or air being interposed between glass plates 24 and 36.

While the plates 22, 24 and 36 have been described as being glass, it is to be understood that depending on the temperature requirements, such could be made of other materials such as clear, transparent plastic.

In operation, as the visible spectrum of electromagnetic radiation is emitted from the sun, such is first passed through the outer plate 36. A portion of the incoming radiation is reflected upon engaging the outer surface of the plate 36. The remaining passes through the plate 36 towards the absorber surface 18. Additional reflection takes place as the incoming radiation engages the lower surface of the plate 36. As the radiation continues downwardly it then passes through the glass plate 24 the fluid in conduit 26, and glass plate 22 to strike the inclined surfaces of the absorber 18. Similar reflection as described in connection with plate 36 takes place as the radiation passes through plates 22 and 24. The waves engaging the inclined surfaces 20 of the absorber heat the fluid passing through the central bore 34 extending therethrough.

Depending on the temperature difference between the surface of the absorber 18 and the lower surface of the glass plate 22 infrared radiation will be transferred therebetween heating the glass plate 22. This infrared radiation is absorbed by the plate 22 and is transferred by conduction to the working fluid in conduit 26 flowing therethrough. Since the working fluid entering the inlet 28 is at a low temperature, such will reduce the temperature of the glass plates 22 and 24. As the fluid passes through the conduit 26, its temperature is raised and exits out of the outlet 30 for subsequent use as a preheated fluid. Since the temperature of the glass plate 24 has been reduced, a lesser amount of radiation than normal would radiate from glass 24 to the outer glass 36. Therefore, the overall thermal energy loss of the system is reduced.

It is to be understood that the terms solar radiation and electromagnetic radiation have been used interchangeably to refer to the energy or radiation emitted by the sun, however, the apparatus disclosed in accordance with the invention may also be used to absorb energy emitted from other bodies as well.

While a preferred embodiment of the invention has been described using specific terms, such description is for illustrative purposes only, and it is to be understood that changes and variations may be made without departing from the spirit or scope of the following claims.

What is claimed is:

1. An apparatus for absorbing electromagnetic radiation waves emitted from the sun and for converting said radiation waves into thermal energy for heating a fluid comprising:

a source of fluid;

an absorbing base structure for absorbing the visible spectrum of electromagnetic radiation and for conversion of said radiation into thermal energy;

said absorbing base structure having an upper surface exposed to receive solar radiation, said surface having a high absorption factor for absorbing the visible spectrum of electromagnetic radiation;

said base structure further comprising fluid conduits below said upper surface;

a plurality of spaced transparent plates aligned above and parallel with said absorbing base structure in adjacent layers for transmitting said visible spectrum of electromagnetic radiation toward said absorbing structure and for trapping within said layers of plates heat from the infrared radiation reradiated from said absorbing base structure;

means for circulating fluid from said source between intermediate layers of said spaced plates for removing the heat from said plates;

means for conveying fluid from said source through said conduits in heat exchange relationship with said absorbing base structure for permitting said thermal energy to be absorbed by said fluid;

whereby the absorbing base structure absorbs the visible spectrum of the electromagnetic radiation transmitted through said plates for conversion into thermal energy and the heat loss through reradiation from said absorbing base structure is reduced by circulating said fluid between intermediate layers of said plates to carry away said reradiated heat.

2. The apparatus as defined in claim 1 wherein said plurality of plates comprise:

a first plate adjacent said surface of said absorbing base structure;

a second plate adjacent said first plate;

means for sealing each of the ends of said first and second plates for providing a fluid passage therebetween;

an inlet port provided in said sealing means at one of said ends;

an outlet port provided in said sealing means at the other end of said ends;

a third plate adjacent said second plate.

3. The apparatus of claim 1 wherein said absorbing base structure further comprises:
a plurality of adjacent triangular member providing a plurality of angular absorbing surfaces;
a highly absorptive coating on said surfaces having a high absorption factor for absorbing the visible spectrum of the electromagnetic radiation and a low emittance factor;
said fluid conduits comprising a central bore extending through said triangular members for conveying said fluid in heat exchange relationship.

* * * * *